United States Patent
Khanal et al.

(10) Patent No.: US 10,063,434 B1
(45) Date of Patent: Aug. 28, 2018

(54) CLASSIFYING APPLICATIONS OR ACTIVITIES BASED ON NETWORK BEHAVIOR

(71) Applicant: ExtraHop Networks, Inc., Seattle, WA (US)

(72) Inventors: Bhushan Prasad Khanal, Seattle, WA (US); Xue Jun Wu, Seattle, WA (US); Eric Jacob Ball, Seattle, WA (US); Casey Alvin Marks, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

(21) Appl. No.: 15/690,135

(22) Filed: Aug. 29, 2017

(51) Int. Cl.
*H04L 12/26* (2006.01)
*G06N 99/00* (2010.01)
*H04L 29/08* (2006.01)

(52) U.S. Cl.
CPC .......... *H04L 43/04* (2013.01); *G06N 99/005* (2013.01); *H04L 43/12* (2013.01); *H04L 67/30* (2013.01)

(58) Field of Classification Search
CPC ......... H04L 43/04; H04L 43/12; H04L 67/30; G06N 99/005
See application file for complete search history.

(56) References Cited

U.S. PATENT DOCUMENTS

| | | |
|---|---|---|
| 5,430,727 A | 7/1995 | Callon |
| 5,541,995 A | 7/1996 | Normile et al. |
| 5,787,237 A | 7/1998 | Reilly |
| 5,802,599 A | 9/1998 | Cabrera et al. |
| 5,835,726 A | 11/1998 | Shwed et al. |
| 6,141,686 A | 10/2000 | Jackowski et al. |
| 6,765,909 B1 | 7/2004 | Sen et al. |
| 6,807,156 B1 | 10/2004 | Veres et al. |
| 7,089,326 B2 | 8/2006 | Boucher et al. |
| 7,193,968 B1 | 3/2007 | Kapoor et al. |
| 7,313,141 B2 | 12/2007 | Kan et al. |
| 7,480,292 B2 | 1/2009 | Busi et al. |
| 7,545,499 B2 | 6/2009 | Overbeck et al. |

(Continued)

OTHER PUBLICATIONS

Official Communication for U.S. Appl. No. 13/831,673 dated Sep. 30, 2013, 10 pages.

(Continued)

*Primary Examiner* — Kashif Siddiqui
(74) *Attorney, Agent, or Firm* — John W. Branch; Lowe Graham Jones PLLC

(57) ABSTRACT

Embodiments are directed to monitoring network traffic in a network. A network monitoring engine may be employed to monitor the network to provide metric profiles based on a plurality of characteristics associated with one or more network flows. The network monitoring engine may provide profile objects based on the metric profiles. The network monitoring engine may provide the profile objects to a classifier engine. The classifier engine provide trained activity models selected from a plurality of trained activity models that may be based on a ranked ordering of characteristics of the trained activity models and the profile objects. The classifier engine may provide classification results for the profile objects based on the trained activity models. And, the network monitoring engine may execute policies based on the classification results associated with the profile objects.

30 Claims, 11 Drawing Sheets

(56) References Cited

U.S. PATENT DOCUMENTS

| | | |
|---|---|---|
| 7,602,731 B2 | 10/2009 | Jain |
| 7,864,764 B1 | 1/2011 | Ma et al. |
| 7,979,555 B2 | 7/2011 | Rothstein et al. |
| 8,079,083 B1 | 12/2011 | Bennett et al. |
| 8,125,908 B2 | 2/2012 | Rothstein et al. |
| 8,185,953 B2 | 5/2012 | Rothstein et al. |
| 8,411,677 B1 | 4/2013 | Colloff |
| 8,619,579 B1 | 12/2013 | Rothstein et al. |
| 2002/0024964 A1 | 2/2002 | Baum et al. |
| 2002/0080720 A1 | 6/2002 | Pegrum et al. |
| 2002/0091844 A1 | 7/2002 | Craft et al. |
| 2003/0152094 A1 | 8/2003 | Colavito et al. |
| 2003/0204621 A1 | 10/2003 | Poletto et al. |
| 2003/0214913 A1 | 11/2003 | Kan et al. |
| 2004/0003094 A1 | 1/2004 | See |
| 2004/0047325 A1 | 3/2004 | Hameleers et al. |
| 2004/0088557 A1 | 5/2004 | Malcolm et al. |
| 2004/0093513 A1 | 5/2004 | Cantrell et al. |
| 2004/0250059 A1 | 12/2004 | Ramelson et al. |
| 2005/0060427 A1 | 3/2005 | Phillips et al. |
| 2005/0091357 A1 | 4/2005 | Krantz et al. |
| 2005/0100000 A1 | 5/2005 | Faulkner et al. |
| 2005/0182833 A1 | 8/2005 | Duffie et al. |
| 2005/0210242 A1 | 9/2005 | Troxel et al. |
| 2006/0029096 A1 | 2/2006 | Babbar et al. |
| 2014/0040451 A1 | 2/2006 | Agrawal et al. |
| 2006/0045017 A1 | 3/2006 | Yamasaki |
| 2006/0123477 A1 | 6/2006 | Raghavan et al. |
| 2007/0088845 A1 | 4/2007 | Memon et al. |
| 2007/0156919 A1 | 7/2007 | Potti et al. |
| 2007/0192863 A1 | 8/2007 | Kapoor et al. |
| 2008/0062995 A1 | 3/2008 | Kaas |
| 2008/0069002 A1 | 3/2008 | Savoor et al. |
| 2008/0130659 A1 | 6/2008 | Polland |
| 2008/0141275 A1 | 6/2008 | Borgendale et al. |
| 2008/0222717 A1 | 9/2008 | Rothstein et al. |
| 2009/0225675 A1 | 9/2009 | Baum et al. |
| 2009/0245083 A1 | 10/2009 | Hamzeh |
| 2009/0292954 A1* | 11/2009 | Jiang ................ G06F 11/0709 714/47.2 |
| 2009/0296593 A1 | 12/2009 | Prescott |
| 2010/0091770 A1 | 4/2010 | Ishikawa |
| 2010/0095367 A1 | 4/2010 | Narayanaswamy |
| 2010/0250928 A1 | 9/2010 | Goto |
| 2010/0316216 A1 | 12/2010 | Fukushima et al. |
| 2010/0322248 A1 | 12/2010 | Ivanov |
| 2011/0019574 A1 | 1/2011 | Malomsoky et al. |
| 2011/0073490 A1 | 3/2011 | Hayamizu et al. |
| 2011/0280149 A1 | 11/2011 | Okada et al. |
| 2012/0176917 A1 | 7/2012 | Matityahu et al. |
| 2012/0215328 A1 | 8/2012 | Schmelzer |
| 2012/0243533 A1 | 9/2012 | Leong |
| 2012/0294305 A1 | 11/2012 | Rose et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0103734 A1 | 4/2013 | Boldyrev et al. |
| 2013/0166730 A1 | 6/2013 | Wilkinson |
| 2013/0232104 A1 | 9/2013 | Goyal et al. |
| 2014/0142972 A1 | 5/2014 | Hosenfeld, Jr. |
| 2014/0164584 A1* | 6/2014 | Joe ................ H04L 12/5689 709/223 |
| 2016/0359872 A1* | 12/2016 | Yadav ................ H04L 43/04 |

OTHER PUBLICATIONS

Official Communication for U.S. Appl. No. 13/831,673 dated Mar. 6, 2014, 12 pages.
Official Communication for U.S. Appl. No. 13/831,673 dated May 22, 2014, 5 pages.
Official Communication for U.S. Appl. No. 14/518,996 dated Nov. 20, 2014, 41 pages.
Official Communication for U.S. Appl. No. 13/831,908 dated Jun. 25, 2014, 15 pages.
Official Communication for U.S. Appl. No. 14/500,393 dated Nov. 20, 2014, 15 pages.
Official Communication for U.S. Appl. No. 13/831,908 dated Apr. 9, 2014, 3 pages.
Official Communication for U.S. Appl. No. 13/831,903 dated Aug. 9, 2013, 29 pages.
Official Communication for U.S. Appl. No. 13/831,908 dated Jan. 13, 2014, 31 pages.
Official Communication for U.S. Appl. No. 13/831,959 dated Aug. 22, 2013, 9 pages.
Handel et al. "Hiding Data in the OSI Network Model," Los Alamos, New Mexico, 1996, 16 pages.
Official Communication for U.S. Appl. No. 14/107,631 dated Feb. 20, 2014, 16 pages.
Official Communication for U.S. Appl. No. 14/107,631 dated Sep. 26, 2014, 14 pages.
Handley et al., "Network Intrusion Detection: Evasion, Traffic Normalization, and End-to-End Protocol Semantics," 2011, International Computer Science institute, 17 pages.
Information Sciences Institute, "Internet Protocol Darpa Internet Program Protocol Specification," Sep. 1981; 36 pages.
Fuertes, "Evaluation of OSPF Extensions in MANET Routing," Paris, 2007, 192 pages.
Parsons, "Moving Across the Internet: Code-Bodies, Code-Corpses, and Network Architecture," May 9, 2010, 20 pages.
Zander et al., "Covert Channels and Countermeasures in Computer Network Protocols," Dec. 2007, 7 pages.
Official Communication for U.S. Appl. No. 14/500,393 dated Feb. 18, 2015, 11 pages.
Official Communication for U.S. Appl. No. 14/107,631 dated Dec. 30, 2014, 12 pages.
Official Communication for U.S. Appl. No. 13/831,626 dated Sep. 3, 2013, 17 pages.
Official Communication for U.S. Appl. No. 14/107,580 dated Mar. 17, 2015, 5 pages.
Official Communication for U.S. Appl. No. 14/107,580 dated Sep. 15, 2014, 16 pages.
Official Communication for U.S. Appl. No. 14/107,580 dated Mar. 6, 2014, 13 pages.

* cited by examiner

CLASSIFYING APPLICATIONS OR ACTIVITIES BASED ON NETWORK BEHAVIOR

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software agent running on the client or server. In virtual environments, port mirroring may be performed on a virtual switch that is incorporated within the hypervisor.

In some instances, a proxy is actively arranged between two endpoints, such as a client device and a server device. The proxy intercepts each packet sent by each endpoint and optionally transforms and forwards the payload to the other endpoint. Proxies often enable a variety of additional services such as load balancing, caching, content filtering, and access control. In some instances, the proxy may operate as a network monitor. In other instances, the proxy may forward a copy of the packets to a separate network monitor.

Furthermore, programs and processes running on various hosts or endpoints may have their host-based characteristics analyzed using host based services that may be executing on the same host. Accordingly, in some cases, host based services may be employed to classify services based on their host-based characteristics. However, in some cases one or more host-based characteristics associated with a given service may be modified, obfuscated, or copied. In some cases, changes to host-based characteristics may be inadvertent or malicious. In either case, in some cases, host-based characteristics may be ineffective at classifying applications or services because the host-based characteristics may change even though the behavior or activity of the application or service may remain unchanged. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
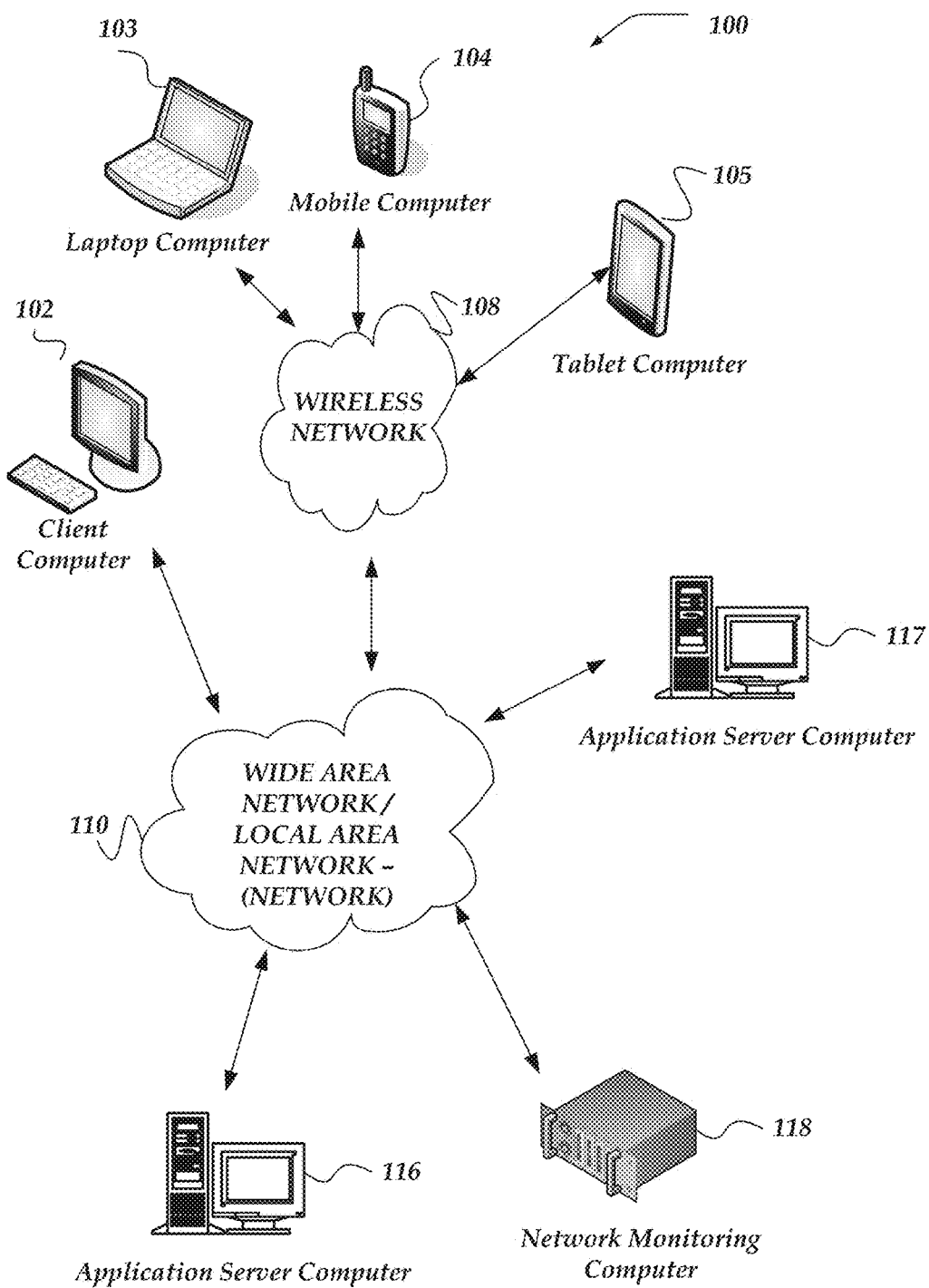
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In at least one embodiment, the NMC may passively monitor network packet traffic without participating in the communication protocols. This monitoring may be performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client and/or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated and/or applied over time to further classify the observed protocols. In some embodiments, NMCs may be arranged to employ stateful analysis. Accordingly, for each supported protocols, an NMD may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In at least one of the various embodiments, NMCs and/or NMC functionality may be implemented using hardware or software based proxy devices that may be arranged to intercept network traffic in the monitored networks.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from four to seven, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "agent" refers to an actor in the monitored network. Agents may include applications, services, programs, processes, network devices, or the like, operating in the monitored network. For example, individual agents may include, web clients, web servers, database clients, database servers, mobile app clients, payment processors, groupware clients, groupware services, or the like. In some cases, multiple agents may co-exist on the same network computer, process, application, or cloud compute instance.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic in a network. In one or more of the various embodiments, a network monitoring engine may be employed to perform various actions. In one or more of the various embodiments, the network monitoring engine may be employed to monitor the network to provide one or more metric profiles based on a plurality of characteristics associated with one or more network flows.

In one or more of the various embodiments, the network monitoring engine may provide one or more profile objects based on the one or more metric profiles. In one or more of the various embodiments, providing the one or more profile objects may include: selecting two or more metric profiles that may be associated with a same activity; and providing one or more of the one or more profile objects based on the two or more metric profiles. In one or more of the various embodiments, providing the one or more profile objects may include, discovering one or more metrics that correspond to a network entity in the monitored network based on the characteristics of the one or more network flows using characteristics may be separate from process characteristics associated with the entity.

In one or more of the various embodiments, the network monitoring engine may provide the one or more profile objects to a classifier engine.

In one or more of the various embodiments, the classifier engine may be employed to provide one or more trained activity models selected from a plurality of trained activity models that may be based on a ranked ordering of one or more characteristics of the one or more trained activity models and the one or more profile objects.

In one or more of the various embodiments, the classifier engine may provide one or more classification results for the one or more profile objects based on the one or more trained activity models. In one or more of the various embodiments, providing the one or more classification results may include, identifying one or more malicious processes or applications (e.g., malware) based on one or more characteristics of the one or more network flows such that the characteristics used to identify the one or more malicious processes may be collected remotely from process characteristics that may be associated with a host that is executing the one or more malicious processes or applications.

And, in one or more of the various embodiments, the network monitoring engine may execute one or more policies based on the one or more classification results associated with the one or more profile objects. In one or more of the various embodiments, the one or more policies may include, performing one or more of providing notification messages, providing events, creating log entries, raising user-interface alarms, raising other alarms, or the like. Further, in some embodiments, classification results may be provided to other services or systems such as firewall devices, or the like, that may be configured to perform various operations in response to the classification results.

In one or more of the various embodiments, one or more labeled profile objects and one or more untrained activity models may be provided to a training engine.

In one or more of the various embodiments, the training engine may be employed to train the one or more untrained activity models based on the one or more labeled profile objects and one or more characteristics of the one or more untrained activity models.

And, in one or more of the various embodiments, the training engine may provide the one or more newly trained activity models to the classifier engine, such that the one or more newly trained activity models may be employed by the classifier engine to classify the one or more profile objects.

In one or more of the various embodiments, the network monitoring engine may be employed to provide one or more other profile objects that represent devices on the network, including, one or more of network computers, routers, switches, desktop computers, virtual devices, virtualized components, virtual networks, containers, mobile computers, smart phones, Internet-of-Things (IoT) devices, or the like.

In one or more of the various embodiments, the network monitoring engine may be employed to update one or more existing profile objects based on further monitoring of the one or more network flows or monitoring of one or more new network flows.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, Application Server Computer 116, Application Server Computer 117, Network monitoring computer 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, application server computer 117, network monitoring computer 118, or other computers.

Client computers 102-105 may further be configured to include a client application that enables an end-user to log into an end-user account that may be managed by another computer, such as application server computer 116, application server computer 117, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to network monitoring computer 118. Also, client computers may be arranged to enable users to display reports, interactive user-interfaces, and/or results provided by network monitor computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 117, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 and/or application server computer 117 is described in more detail below in conjunction with FIG. 3. Briefly, however, application server computer 116-117 includes virtually any network computer capable of hosting applications and/or providing services in network environment.

One embodiment of network monitoring computer 118 is described in more detail below in conjunction with FIG. 3. Briefly, however, network monitoring computer 118 may include virtually any network computer that is specialized to enable passively monitoring communication traffic in a network environment.

Although FIG. 1 illustrates application server computer 116, application server computer 117, and network monitor device 118, each as a single computer, the innovations and/or embodiments are not so limited. For example, one or more functions of application server computers 116-117, and/or network monitoring computer 118, or the like, may be distributed across one or more distinct network computers. Moreover, in at least one embodiment, network monitoring computer 118 may be implemented using a plurality of network computers. Further, in at least one of the various embodiments, application server computers 116-117, and/or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
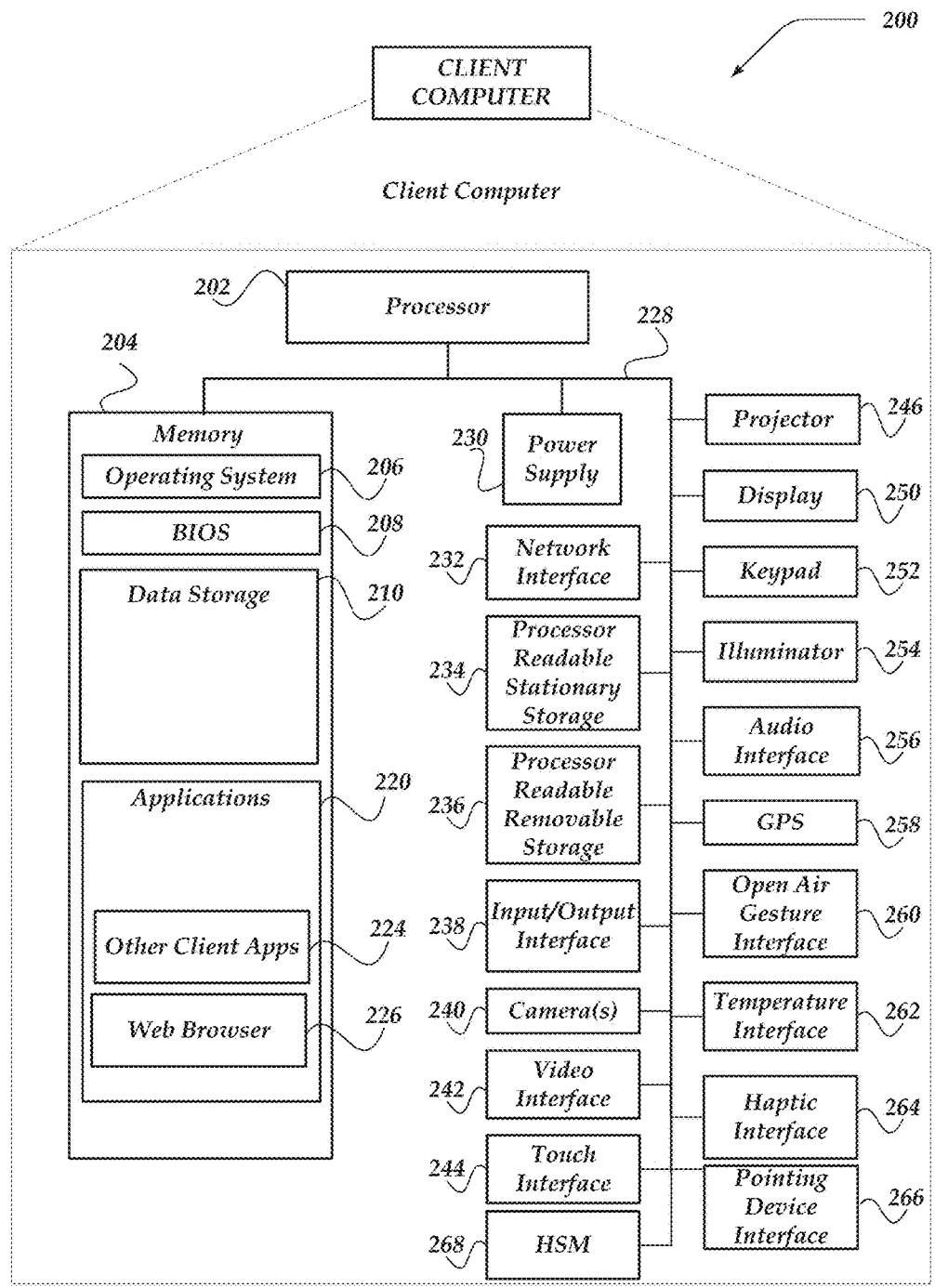
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
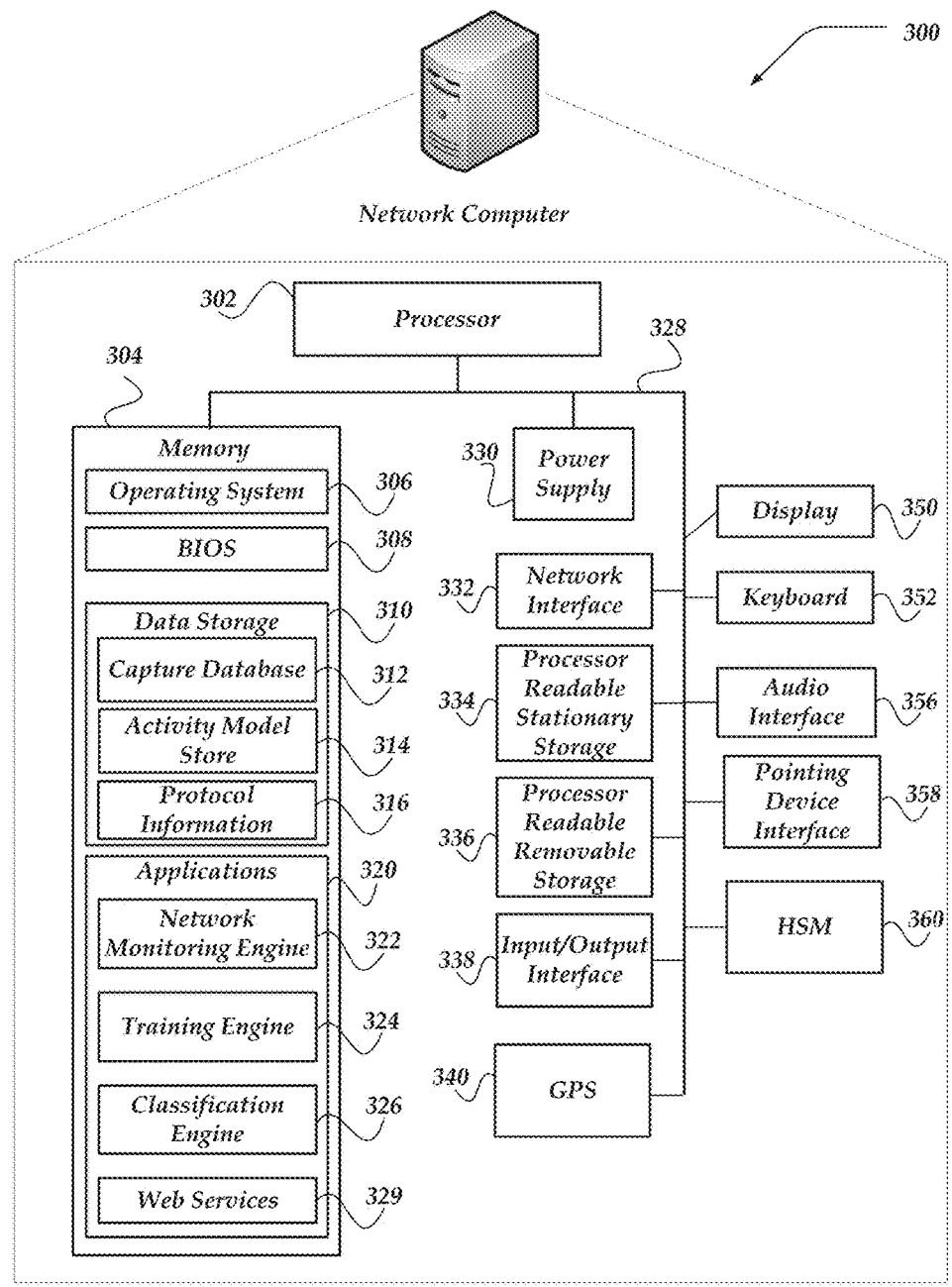
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computers 116-117 or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information provided as described here through human interface components such as display 350 or keyboard 352 can instead be provided through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, capture database 312, activity model database 314, protocol information 316, or the like. Capture database 312 may be a data store that contains one or more records, logs, events, or the like, produced during monitoring of the networks. Activity model database 314 may be arranged to store one or more data structures that represent activity models. And, protocol information 316 may store various rules and/or configuration information related to one or more network communication protocols or application protocols that may be employed by devices or services in monitored networks, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, training engine 324, classification engine 326, web services 329, or the like, that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, network monitoring engine 322, training engine 324, classification engine 326, web services 329, or the like, may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to network monitoring engine 322, training engine 324, classification engine 326, web services 329, or the like, may be provisioned and de-commissioned automatically.

Also, in at least one of the various embodiments, network monitoring engine 322, training engine 324, classification engine 326, web services 329, or the like, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), the network computer may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In at least one embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
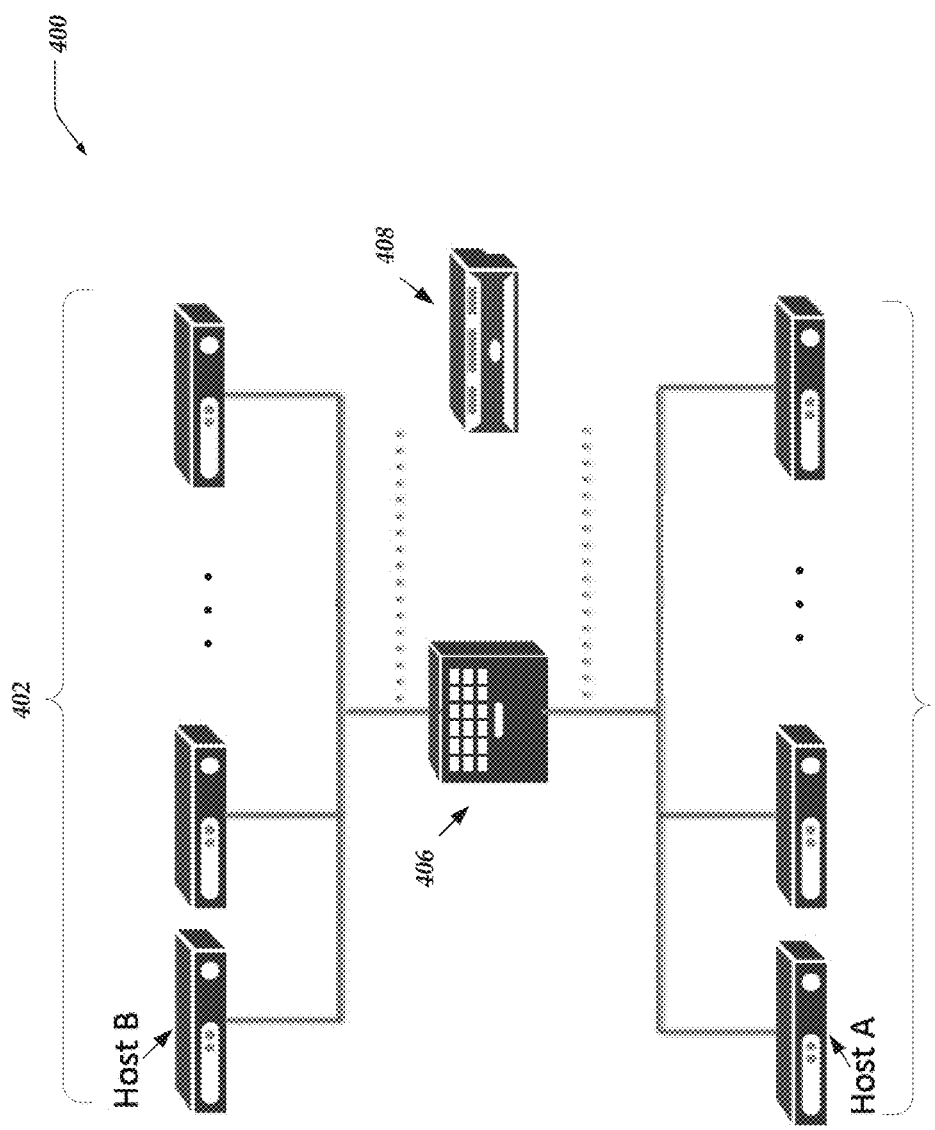
FIG. 4 illustrates a logical architecture of a system for classifying applications or activities based on network behavior in accordance with one or more of the various embodiments.

FIG. 4 illustrates a logical architecture of system 400 for classifying applications or activities based on network behavior in accordance with one or more of the various embodiments. System 400 may be arranged to include a plurality of network devices and/or network computers on first network 402 and a plurality of network devices and/or network computers on second network 404. Communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

Also, NMC 408 may be arranged to passively monitor network communication between and among hosts that are on the same network, such as, network computers 402.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

In one or more of the various embodiments, some or all network flows, network traffic, network packets, traffic profile information, or the like, observed by NMC 408 may be stored in data store that enables further processing. In some embodiments, a training engine (not shown) may be arranged for training activity models. Accordingly, in some embodiments, training engines may be enabled to employ some or all of the captured network flows, network traffic, network packets, traffic profile information, or the like.

Also, in one or more of the various embodiments, NMCs, such as, NMC 408 may be arranged to provide real-time network flows, network traffic, network packets, traffic profile information, or the like, to a classification engine (not shown). In some embodiments, classification engines may be arranged employ one or more activity models to classify network flows, network traffic, network packets, traffic profile information, network devices, or the like.

Figure 5A:
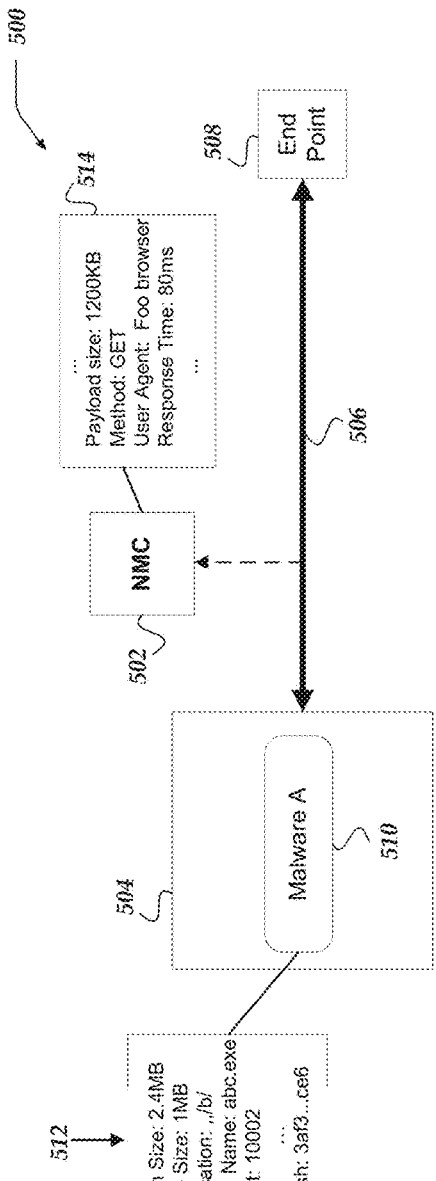
FIGS. 5A and 5B represent logical system architectures for a system for classifying applications or activities based on network behavior in accordance with one or more of the various embodiments.
Figure 5B:
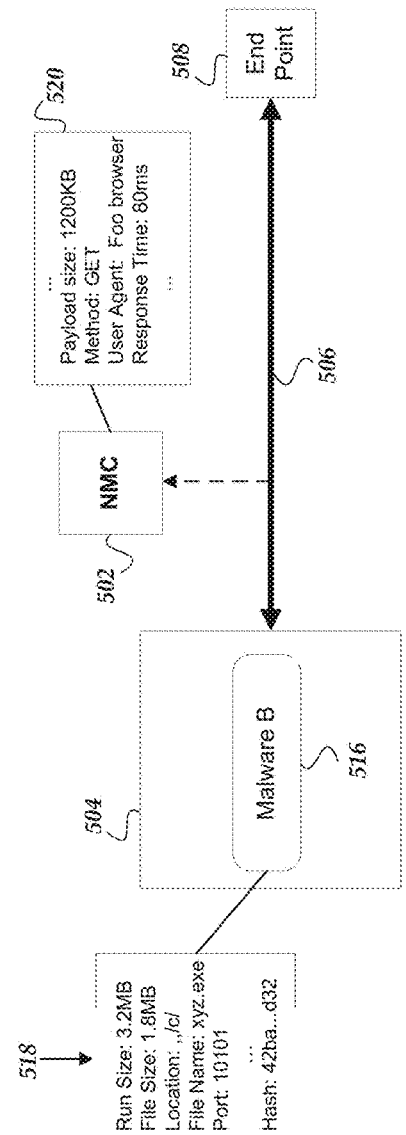

FIGS. 5A and 5B represent logical system architectures for system 500 for classifying applications or activities based on network behavior in accordance with one or more of the various embodiments. In this example, for one or more embodiments, system 500 includes NMC 502, host device 504, network 506 and endpoint 508.

In one or more of the various embodiments, NMC 502 may be arranged to monitor network traffic on network 506. In this example, the monitored network traffic includes one or more network flows exchanging network traffic between host device 504 and endpoint 508.

In one or more of the various embodiments, host device 504 may represent various network devices, network computers, client computers, or the like, operating in a networked environment. Likewise, in some embodiments, endpoint 508 may represent various network endpoints, such as, applications, network computers, network devices, other host devices, or the like.

FIG. 5A illustrates system 500 where a malware process, such as, malware 510 may be running on host device 504. In this example, malware 510 may have various process characteristics, such as, process characteristics 512. In one or more of the various embodiments, process characteristics may include one or more properties corresponding to malware 510. For example, in some embodiments, process characteristics 512 may include various properties, such as, run size (resident memory during runtime), file size, file location (a path on the host), file name, hash value (based on a hash of binary executable of malware, and so on), or the like.

In one or more of the various embodiments, process characteristic values may be based on various discoverable or visible attributes of a binary executable hosted or executing on a computer. In one or more of the various embodiments, the process characteristics may be observed by other processes or agents running on the same host as a given process. For example, in some embodiments, process characteristics may be characteristics that a locally executing computer virus detection program may observe assuming they have the appropriate permissions. Further, in some embodiments, various operating systems or file systems may provide APIs for discovering process characteristics of running programs.

In one or more of the various embodiments, NMC 502 may be arranged to passively monitor the network traffic exchanged between malware 510 and endpoint 508. Accordingly, in one or more of the various embodiments, NMC 502 may be arranged to collect various metrics associated with the network traffic between malware 510 and endpoint 508.

Accordingly, in one or more of the various embodiments, NMC 502 may be arranged to generate metric profiles, such as metric profile 514. In this example, metric profiles 514 may be based on metrics that may be discoverable from passive observation of network traffic on network 506. In one or more of the various embodiments, metric profiles, such as, metric profile 514 may be associated with various entities having various scope, such as, network flows, network devices, applications, endpoints, networks, parts or networks, ports, or the like. For example, in some embodiments, an application that may be associated with one or more network flow, may be associated with a metric profile that may be based on one or more metrics of its constituent network flows. Likewise, for example, individual network flows may be associated with their own metric profile. In some embodiments, NMCs may be arranged to employ configuration information or rules to select the scope of metric profiles. In some embodiments, a default scope may be defined. Accordingly, in one or more of the various embodiments, metric profiles having the default scope may be provided in the absence of more specific or specialization policies.

For example, in one or more of the various embodiments, a NMC may be configured to provide metric profiles for particular applications, such as, databases, while providing metric profiles scoped to network flows for non-database traffic. In one or more of the various embodiments, NMCs may be arranged to employ dynamic policies that adjust or modify metric profile scoping rules based on one or more defined conditions being met. For example, in one or more of the various embodiments, the NMC may be configured to provide application scoped metric profiles. Then, for example, if one or more metrics associated with an application exceed a defined threshold, network flow scoped metric profiles may be provided for network flows associated with the applications.

Further, in one or more of the various embodiments, NMC 502 may be arranged to select or exclude one or more network flows, applications, endpoints, or the like, from metric collection based on the execution of configuration information or policy rules.

In one or more of the various embodiments, NMC 502 may be arranged to collect metrics based on passive monitoring of network 506, this it is not reliant on direct access to the file system, execution space, users, access lists, permissions, memory, disk drives, or the like, of host device 504 or endpoint 508.

In one or more of the various embodiments, host based malware detection or protection services may be enabled to use process characteristic, such as process characteristics 512 to identify suspected malware, such as malware 512. Such malware detection services may employ databases of signatures based on various process characteristics. Accordingly, the malware detection service may compare process characteristic of processes running on a host, such as, host device 504, to known process characteristics (or signatures made from one or more process characteristics) of known malware services. Thus, in this example, if process characteristics 512 of malware 510 match a known malware process, a malware detection service may make notifications or perform remediation as so configured.

Accordingly, in one or more of the various embodiments, if process characteristics collected for a process, such as malware 510 do not match known malware signatures, malware 510 may be undetected by host based malware detection services.

In contrast, in this example, for some embodiments, NMC 502 may provide metric profile 514 for malware 510 based on monitoring network traffic exchanged between malware 510 and endpoint 508. In this example, in one or more of the various embodiments, metric profile 514 comprises various metrics associated with network traffic or network behavior associated with malware 510.

In one or more of the various embodiments, NMCs may be arranged to employ metric profiles, such as metric profile 514, as signatures to identify malware based on their network activity (as represented by one or more metric profiles) to train one or more machine learning classifiers that may be employed for identifying malware, or the like.

Further, in one or more of the various embodiments, NMCs may be arranged to employ metric profiles, such as metric profile 514 to provide information to include in profile objects that may be used to train one or more machine learning classifiers that may be employed for identifying malware, or the like. The profile objects may be provided to a classifier engine that may be arranged to run the profile objects against one or more activity models to classify processes based on their network activity rather than their host based process characteristics. In one or more of the various embodiments, profile objects may be employed rather than metric profile because profile objects may represent broader concepts (e.g., activities) than the metric profiles. Further, in some embodiments, metric profiles may be used in other contexts for network management or monitoring, whereas profile objects are intended to represent data used for training activity models or for being classified by activity models.

FIG. 5B illustrates system 500 where a different malware process, such as, malware 516 may be running on host device 504. In this example, a host based malware detection service may examine process characteristics 518 to try to identify malware 516 as a malicious process running on host 504. However, in this example, malware 516 represents a process derived from malware 510 that has been modified such that its process characteristics are different. Accordingly, in this example, process characteristics 518 may be considered to be sufficiently different than process characteristics 512 such that malware 516 may not be identified by a host based detection service because malware 516's host based signature may not match a signature of a known malware, such as, a signature for malware 510.

However, in this example, NMC 502 provides metric profile 520 for malware 516. And, in this example, because metric profile 520 matches metric profile 514, NMC 502 may be arranged to identify malware 516 as being a potentially malicious service because the metric profile of malware 516 matches (for some definition of match) the metric profile of malware 510.

Figure 6:
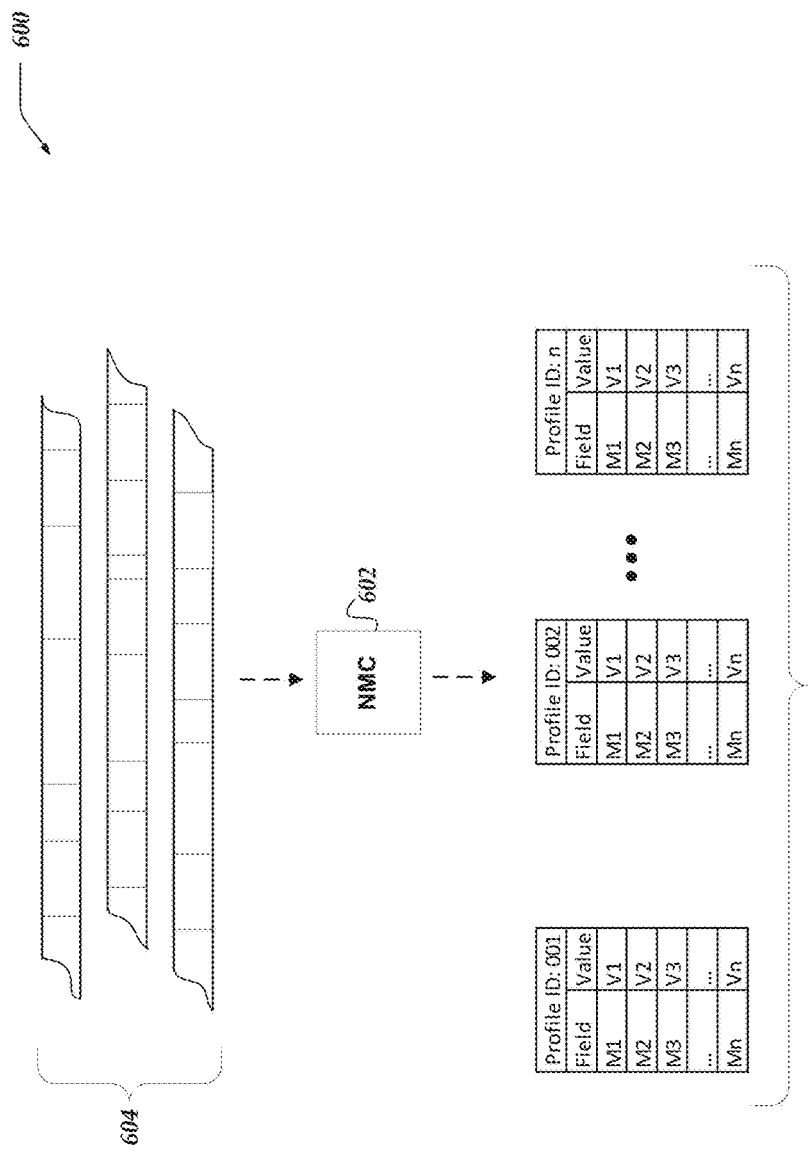
FIG. 6 represents a logical representation of a system for transforming monitored network traffic into profile objects in accordance with one or more of the various embodiments.

FIG. 6 represents a logical representation of system 600 for transforming monitored network traffic into profile objects in accordance with one or more of the various embodiments. In one or more of the various embodiments, MC 602 may be arranged to passively monitor network traffic 604. As described, in some embodiments, NMC 602 may be arranged to provide various metrics associated with monitored network traffic 604.

In one or more of the various embodiments, an NMC may be arranged to transform one or more collected metrics into profile objects suitable for machine learning training of activity models. Likewise, in one or more of the various embodiments, the profile objects may be provided to one or more trained activity models for classifications.

Accordingly, in one or more of the various embodiments, as described above, NMCs such as, NMC 602 may be arranged to collect metrics from monitored network traffic and arrange them into metric profiles. Information from metric profiles may selected or transformed to provide profile objects, such as profile objects 606. In one or more of the various embodiments, profile objects may include one or more collections of fields with values that may be based on network traffic 604 or metric profiles associated with network traffic 602. In one or more of the various embodiments, one or more of the metrics included in a profile object may correspond to metrics collected by the NMC. In other embodiments, one or more of the metrics included in a profile object may be composites based on two or more metrics. Also, in one or more of the various embodiments, one or more metrics may be computed based on one or more observed metrics in one or more metric profiles.

Further, in one or more of the various embodiments, metric values included in profile objects may be normalized to a common schema as well as arithmetically normalized. Normalizing metric values to a common schema may include bucketing values. For example, in some embodiments, observed metrics that have continuous values may be mapped to named buckets, such as high, medium, low, or the like.

In one or more of the various embodiments, NMCs may be arranged to execute one or more ingestion rules to perform the data normalization required for mapping observed (raw) metrics into profile objects field value. in one or more of the various embodiments, one or more ingestion rules may be built-in to NMCs while other ingestion rules may be provided via configuration information, user input, or the like.

Generalized Operations

FIGS. 7-11 represent generalized operations for classifying applications or activities based on network behavior in accordance with one or more of the various embodiments. In at least one of the various embodiments, processes 700, 800, 900, 1000, and 1100 described in conjunction with FIGS. 7-11 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 7-11 may be used for classifying applications or activities based on network behavior in accordance with at least one of the various embodiments and/or architectures such as those described in conjunction with FIGS. 4-6. Further, in at least one of the various embodiments, some or all of the action performed by processes 700, 800, 900, 1000, and 1100 may be executed in part by network monitoring engine 322, training engine 324, or classification engine 326, running on one or more processors of one or more network computers, including one or more NMCs.

Figure 7:
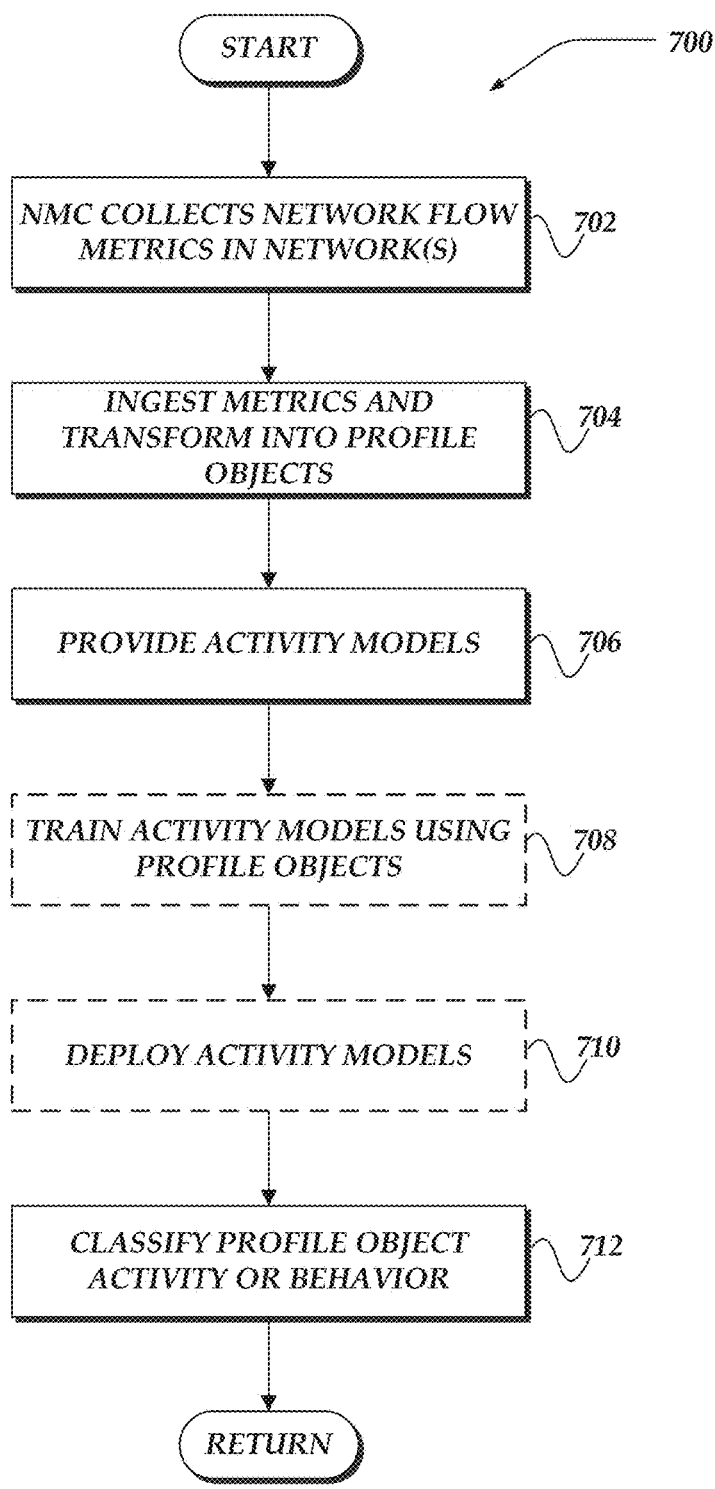
FIG. 7 illustrates an overview flowchart of a process for classifying applications or activities based on network behavior in accordance with one or more of the various embodiments.

FIG. 7 illustrates an overview flowchart of process 700 for classifying applications or activities based on network behavior in accordance with one or more of the various embodiments. After a start block, at block 702, in at least one of the various embodiments, an NMC may be arranged to collect network flow metrics in one or more networks. In some embodiments, NMCs may be arranged to collect thousands of different metrics. In some embodiments, metrics may be grouped or otherwise organized based on protocols, networks, applications, or the like. For example, in some embodiments, an NMC may be arranged to collect metrics related to monitored HTTP traffic, such as, requests/ second, method (e.g., GET, POST, PUT, or the like), response code, HTTP cookie information, payload size, response time, client network addresses, server network addresses, HTTP header values, number of abort connections, or the like.

In one or more of the various embodiments, NMC may be arranged to execute configuration information, such as one or more policy rules that may select the particular metrics to monitor or collect. In one or more of the various embodiments, such configuration information may include scripts, programs, regular expressions, conditions, threshold values, condition dependent actions, or the like, or combination thereof. For example, in some embodiments, an NMC may be arranged to collect a base set of metrics until one or more conditions are met, triggering different or additional metrics to be captured.

At block 704, in one or more of the various embodiments, the NMC may be arranged to ingest some or all of the collected metrics for transformation into profile objects. In some embodiments, the profile objects may be data structures that may be arranged to be suitable for providing to activity models for classification or training. In some embodiments, profile objects include some or all of the metric profile information that a network monitoring engine has collected for entities (e.g., processes, devices, applications, or the like) that have provided network traffic on the network. In some cases, profile objects may be similar to metric profiles described in FIG. 5, however, they are described separately because profile objects may be arranged based on the metric profile rather being exact copies.

Also, in one or more of the various embodiments, because profile objects may represent entities or activities that are observed on the network, a given profile object may include field values that come from more than one metric profile. For example, a profile object representing a malicious behavior, such as, a profile object representing unauthorized downloading, may include information from at least three metric profiles: a metric profile associated with a client that is managing the download, a metric profile associated with the file server where the files are coming from, and a metric profile of the computer or endpoint where the files are being delivered.

At block 706, in one or more of the various embodiments, the NMC may be arranged to provide one or more activity models. In one or more of the various embodiments, activity models may be selected based on one or more characteristics, such as, priority, model type (e.g., binary classifiers, multiclass classifiers, regression models, or the like), precision, accuracy, performance considerations, age, customer service agreement (e.g., some models may be unavailable depending the service agreements with a user or customer), user access rights, or the like, or combination thereof. In one or more of the various embodiments, some profile objects may be associated with a class, type, or category that may be referenced to select the appropriate activity models.

At block 708, in one or more of the various embodiments, optionally, the NMC may be arranged to train the one or more activity models using some or all of the profile objects. In one or more of the various embodiments, a training engine, such as, training engine 324 may be arranged to train one or more machine learning based activity models. In one or more of the various embodiments, the particular actions performed for training activity models may depend on type of model (e.g., linear regression, deep learning, deep neural networks, decision trees, ensembles of two or more smaller models, or the like). Also in some embodiments, the type of training may be dependent on the application the activity models may be targeted towards. For example, in one or more of the various embodiments, for some classification problems one ML model type may be preferred over another. This block may be considered optional because in some embodiments, one or more activity models may have been previously trained.

At block 710, in one or more of the various embodiments, optionally, trained activity models may be deployed for classifying applications or activities based on network behavior. This block may be considered optional because in some embodiments, trained activity models may have been previously deployed.

At block 712, in one or more of the various embodiments, NMCs may be arranged to classify activity or behavior of applications or hosts based on one or more profile objects. In some embodiments, a classification engine, such as, classification engine 326 may be provided one or more profile objects that may be classified by one or more activity models. In one or more of the various embodiments, the particular actions taken based on a classification result may be determined using configuration information, including one or more policy rules.

Next, control may be returned to a calling process.

Figure 8:
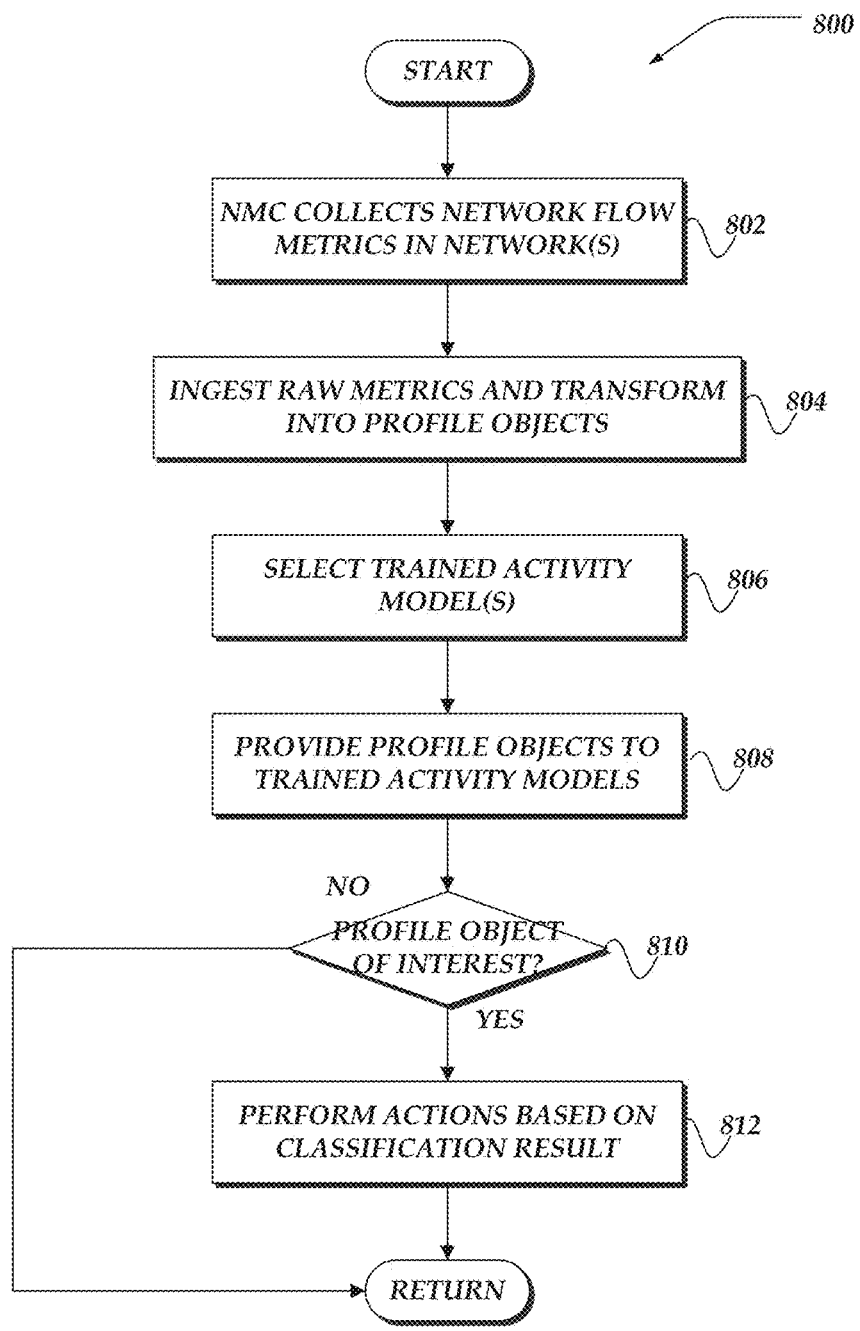
FIG. 8 illustrates a flowchart of a process for classifying applications or activities based on profile objects in accordance with one or more of the various embodiments.

FIG. 8 illustrates a flowchart of process 800 for classifying applications or activities based on profile objects in accordance with one or more of the various embodiments. After a start block, at block 802, in at least one of the various embodiments, an NMC may be arranged to collect network flow metrics in one or more networks. As described above, the NMC may be configured to passively monitor the network traffic of one or more networks.

In one or more of the various embodiments, the NMC may be arranged to collect one or more metrics in real-time based on real-time monitoring of the network traffic. However, in some embodiments, the NMC may be arranged to process network traffic that may have been captured or stored previously.

At block 804, in one or more of the various embodiments, raw metrics may be ingested and transformed into profile objects. In one or more of the various embodiments, the NMC may be arranged to map raw metric data (e.g., metric profiles) to one or more fields in one or more profile objects. In some embodiments, there may be a one-to-one mapping of some raw metrics to particular fields in one or more profile objects. In other embodiments, some raw metrics may be combined into one or more fields in one or more profile objects. In some embodiments, one or more fields in one or more profile objects may be provided based on one or more transformation tasks that take one or more metrics and provide one or more profile object fields.

In one or more of the various embodiments, raw metrics data associated with more than one entity in the network may be included in the same profile object. This enables profile objects to represent activities or behaviors that include more than entities, such as, an client-server transaction activity. In such an example, metrics associated with the client and metrics associated with the server may be included in a single profile object.

In one or more of the various embodiments, one or more profile objects may be arranged to represent various contexts or scope in the monitored network environment. In one or more of the various embodiments, in some cases, one or more profile objects may be associated with individual network flows. Accordingly, in some embodiments, the profile object field values in such profile object may represent individual network flows.

In one or more of the various embodiments, one or more profile objects may be arranged to represent other entities, aspects or elements of the monitored networks. In some embodiments, profile objects may be arranged to represent applications, hosts, ports, devices, sub-networks, users, related network flows, groups of hosts, groups of network flows, groups of applications, groups of users, network address ranges, namespaces, or the like, or combination thereof.

Also, in one or more of the various embodiments, one or more profile objects may be arranged to represent activities that involve one or more network entities, such as, attempted logins, file downloads, communicating with applications, communication errors, email delivery, or the like. In some embodiments, profile objects associated with activities that include a client and a server may include metrics associated with the client and the server. For example, in one or more of the various embodiments, client metrics may include information collected from monitoring a request it makes to a server. And, for example, the server metrics may include information collected from monitoring its response to the client or to other computers or endpoints. Accordingly, in this example, a profile object representing a particular client-server transaction may be derived from metrics from the client, server, or other entities.

In one or more of the various embodiments, the NMC may be arranged to employ configuration information, including rules to define how profile objects may be associated with a given scope or context. For example, a rule may be defined that maps one or more metrics associated with client database requests to a database profile object. Likewise, in one or more of the various embodiments, other metrics may be collected and included network flow profile objects that may be associated with a single network flow.

In one or more of the various embodiments, profile objects having different contexts may be arranged to include different fields or field values. In one or more of the various embodiments, some fields may be in common with many profile objects, such as, profile ID, date/timestamp, time range, owner, category, class, priority, severity, or the like. In other embodiments, other fields, such as fields related to a particular protocol, application, or activities may be included in profile objects that have the relevant context. Likewise, in some embodiments, profile objects that represent "larger" contexts having broader scope may include more aggregate valued fields that a profile objects associated with a smaller context, such as, a single network flow.

In one or more of the various embodiments, more than one profile object may overlap in the sense that they represent the same network traffic. For example, in some embodiments, a database application profile object may include bitrate information compiled from multiple network flows. However, in some embodiments, each of the contributing network flows may also be associated with a network flow profile object.

Further, in some embodiments, profile objects may be arranged to include fields that are other profile objects. Accordingly, in some embodiments, profile objects may have a hierarchical structure similar to a class hierarchy in object orient programming. Alternatively, in one or more of the various embodiments, profile objects may be arranged into trees or graphs that represent relationships between or among the various profile objects.

At block 806, in one or more of the various embodiments, a classification engine may be arranged to select one or more activity models. In one or more of the various embodiments, an NMC may be associated with a collection of previously trained activity models. Accordingly, in one or more of the various embodiments, the NMC may be arranged to select activity models from its collection of activity models. In one or more of the various embodiments, the specific selection categories or criteria may be provided using configuration information or one or more rules. For example, in some embodiments, some activity models may be configured for classifying all network flow profile objects. In some cases, some activity models may be configured for classifying certain profile objects, such as, profile objects associated with specific applications, protocols, hosts, devices, users, clients, or the like.

In one or more of the various embodiments, some activity models may be configured to be selected for all profile objects of a given type. For example, one or more activity models may be selected based on profile object features such as, category, class, priority, severity, or the like. In some embodiments, one or more activity models may be configured to be selected for a percentage or proportion of a given type of profile object.

For example, in one or more of the various embodiments, one or more activity models may be configured to classify every web server profile objects while another activity model is configured to classify 10% of HTTP packets. In some embodiments, an activity model may be configured to provided profile objects that have field values that meet one or more conditions. For example, in some embodiments, HTTP client profile objects that include a user-agent field may be provided to different activity models depending on the value of their user-agent field. For example, HTTP client profile objects associated with unknown or unexpected user-agent may be provided to activity model while HTTP client profile objects associated with well-known or expected user-agents may be sent to different activity models for classification.

Likewise, in some embodiments, one or more activity models may be configured to be selected every other profile object associated with a given host. Further, in one or more of the various embodiments, the NMC may be configured to exclude one or more profile objects or activity models from being used. For example, in one or more of the various embodiments, a NMC may be arranged to exclude network traffic associated one or more endpoints from classification.

In one or more of the various embodiments, the NMC may be arranged to employ dynamic methods to select one or more activity models. Accordingly, in one or more of the various embodiments, in some conditions one or more activity models may be selected while in other conditions one or more other activity models may be selected. In one or more of the various embodiments, an NMC may be arranged to select additional or alternative activity models depending on various conditions defined using configuration information or rules. For example, in some embodiments, an NMC may be arranged to employ a rule that selects one or more activity models arranged to identify certain malware programs if monitored network traffic exhibits one or more characteristics, such as, targeting a specific TCP port, performing suspicious scans, or the like.

In one or more of the various embodiments, an NMC may be arranged to order one or more of the selected activity models such that one or more of the activity models are applied before others. Accordingly, in one or more of the various embodiments, one or more trained activity models may be selected from a plurality of trained activity models based on a ranked ordering of one or more characteristics of the one or more trained activity models and the one or more profile objects.

Also, in one or more of the various embodiments, the NMC may be arranged to define one or more dependency rules that link or order activity models based on one or more observed conditions.

At block 808, in one or more of the various embodiments, the classification engine may be arranged to provide one or more profile objects to the selected activity models. As mentioned above, the NMC may be arranged to filter or otherwise select one or more profile objects for providing to activity models for classification. In one or more of the various embodiments, the NMC may be arranged to execute configuration information or rules to select the profile objects that may be provided for classification. Accordingly, in one or more of the various embodiments, profile objects may be selected for classification based on various characteristics, including, profile context, network address (e.g., or any tuple information), application, protocol, one or more metric values, age, or the like, or combination thereof.

In one or more of the various embodiments, a classification engine may arranged to provide the profile objects to one or more of the selected activity models. In some embodiments, each activity model may be arranged produce a classification result that corresponds to the provided profile objects. Note, the term classification result is used here even though a particular activity model may not be a classical machine learning classifier. Herein, a classification result refers to a result produced by providing a profile object to a given activity model. Note, in one or more of the various embodiments, a classification engine may be arranged to execute the actions that enable a classification result to be provided from a given activity model and a profile object.

At decision block 810, in one or more of the various embodiments, if the classification engine discovered one or more profile objects that may be of interest, control may flow to block 812; otherwise, control may be returned to a calling process. In one or more of the various embodiments, a profile object may be determined to be of interest based on the classification results associated with the profile object. For example, in one or more of the various embodiments, an activity model trained to detect malware may provide a classification result that indicates that a profile object may be associated with malware.

At block 812, in one or more of the various embodiments, the NMC may be arranged to perform one or more actions based on the classification results. In one or more of the various embodiments, the activity models may be arranged to provide a classification result for one or more profile objects. Accordingly, in one or more of the various embodiments, the NMC may be arranged to perform various actions that depending on the result. In some embodiments, such actions may include selecting one or more additional activity models to further classify the profile object of interest.

In one or more of the various embodiments, some classification results may be in the form of a real number. Accordingly, in one or more of the various embodiments, the NMC may be arranged to take specific actions based on the value of the classification result. For example, in some embodiments, if a regression activity model is being used, the NMC may be arranged to ignore correlation scores of less than a defined value. Likewise, in some embodiments, artificial neural network based activity models may be arranged to provide classification results that incorporate a confidence score, in some example, low confidential results may be ignored, or they may triggered different activity models to be employed to discover if they may produce results having higher confidence.

In one or more of the various embodiments, actions may include providing notification messages, events, log entries, user-interface alarms, other alarms, or the like, or combination thereof, to other systems, users, services, or the like, or combination thereof. Accordingly, in one or more of the various embodiments, one or more of these other systems, users, services, or the like, may be triggered to perform one or more actions. In one or more of the various embodiments, integration with other systems, services, or the like, may be defined using configuration information, rules, or the like.

In one or more of the various embodiments, the NMC may be arranged to execute one or more rules to perform various actions relevant to the profile object or the classification thereof. For example, in some embodiments, if the classification indicates the profile object may be associated with suspicious or malicious behavior, the NMC may be arranged to perform various actions, such as, initiating packet capture of network flows associated with profile object of interest, initiating deeper or more comprehensive packet inspection, activating, enhancing, or increasing logging granularity, or the like. In one or more of the various embodiments, the particular actions may be selected based on configuration information or the execution of rules.

Next, control may be returned to a calling process.

Figure 9:
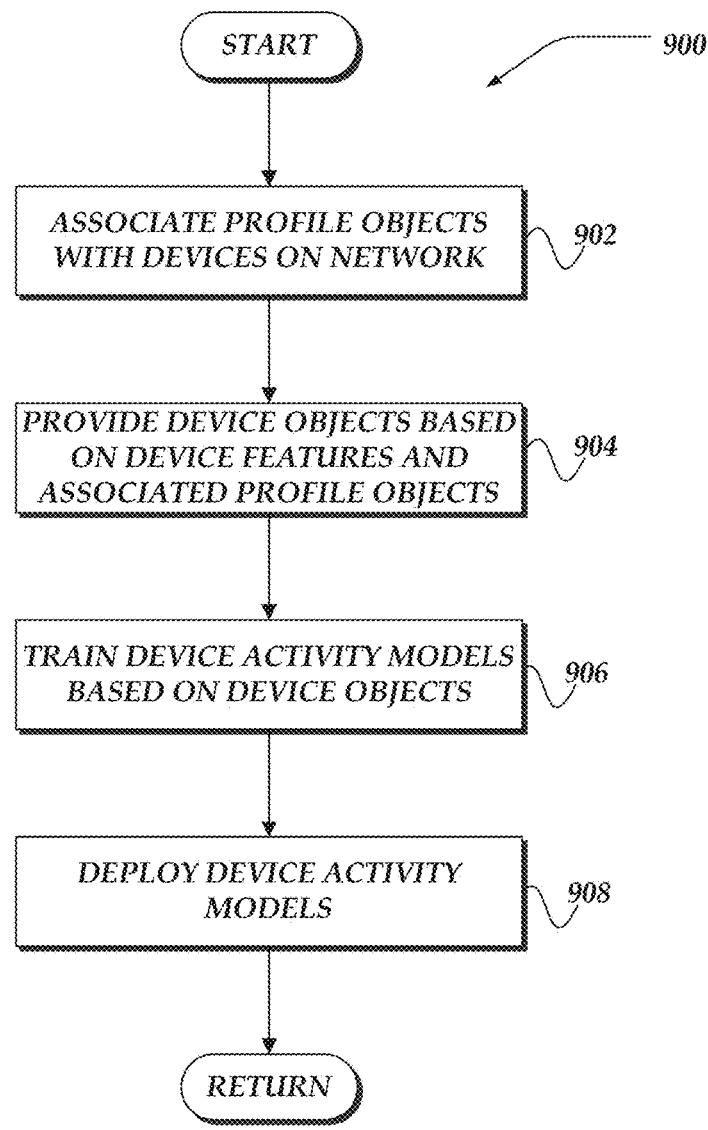
FIG. 9 illustrates a flowchart of a process for classifying applications or activities based on device objects comprised one or more profile objects in accordance with one or more of the various embodiments.

FIG. 9 illustrates a flowchart of process 900 for classifying applications or activities based on device objects comprised one or more profile objects in accordance with one or more of the various embodiments. After a start block, at block 902, in at least one of the various embodiments, an NMC may be arranged to associate one or more profile objects with devices on the network. In one or more of the various embodiments, one or more profile objects may be arranged to represent or otherwise be associated with devices on a monitored network. In some embodiments, devices may include, network computers, routers, switches, desktop computer, mobile computers, smart phones, virtual devices (e.g., virtual machines, virtualized components, or the like), virtual networks (e.g., software defined networks), containers (e.g., Linux® containers, Windows® containers, Docker® containers, or the like), Internet-of-Things (IoT) devices, or the like.

At block 904, in one or more of the various embodiments, the NMC may be arranged to provide one or more device objects based on one or more device features and one or more associated profile objects. In one or more of the various embodiments, device objects may be data structures that logically represent some or all of the devices on a monitored network.

In one or more of the various embodiments, device objects may be a combination of one or more profile objects and additional fields or values represent features of a device. Accordingly, in some embodiments, a device object may be considered to represent the physical or operation properties of a device as well as its behavior.

In one or more of the various embodiments, some fields or values included in a device object may be derived from observed network traffic or network metrics. For example, an NMC may be arranged to monitor network traffic entering a device and compare it with network traffic that leaving the device. Accordingly, the NMC may be arranged to discover the device type based on modifications the device make (if any) to the traffic flowing through it.

In one or more of the various embodiments, the device objects may be arranged to represent the device behavior rather than its physical hardware. For example, a device object representing a network address translation (NAT) device could be a network computer or virtual machine rather than a separate NAT hardware appliance.

In one or more of the various embodiments, similar to profile objects, device objects may be progressively updated, such that as an NMC discovers more information from the monitored network traffic it may update existing device objects, including instantiating new models. For example, initial network traffic may identity a network computer, and further monitoring may identify that the network computer is configured to perform some firewall functions. Accordingly, in this example, a firewall device object may be provided as well as a network computer device object. Further, in one or more of the various embodiments, the NMC may associate two or more devices that may be operating on the same physical hardware. For example, in some embodiments, a network computer configured to perform some firewall behaviors may result in two device objects that are associated with each other. Note, in one or more of the various embodiments, this is similar to how two or more profile objects representing different applications may be associated with each other because they are hosted on the same machine.

At block 906, in one or more of the various embodiments, the NMC may be arranged to train one or more device activity models based on the device objects. In one or more of the various embodiments, a training engine, such as, training engine 324 may be arranged to employ a data set that includes device objects to train one or more device activity models.

In one or more of the various embodiments, similar to how activity models may be trained, device activity models may be trained to classify device objects. As described for activity models, in one or more of the various embodiments, the particular training methods, model structure, machine learning structure, or the like, may be particularized for specific devices, conditions, or behaviors.

At block 908, in one or more of the various embodiments, the NMC may be arranged to deploy the one or more device activity models so they may be made available for classifying device objects. Next, control may be returned to a calling process.

Figure 10:
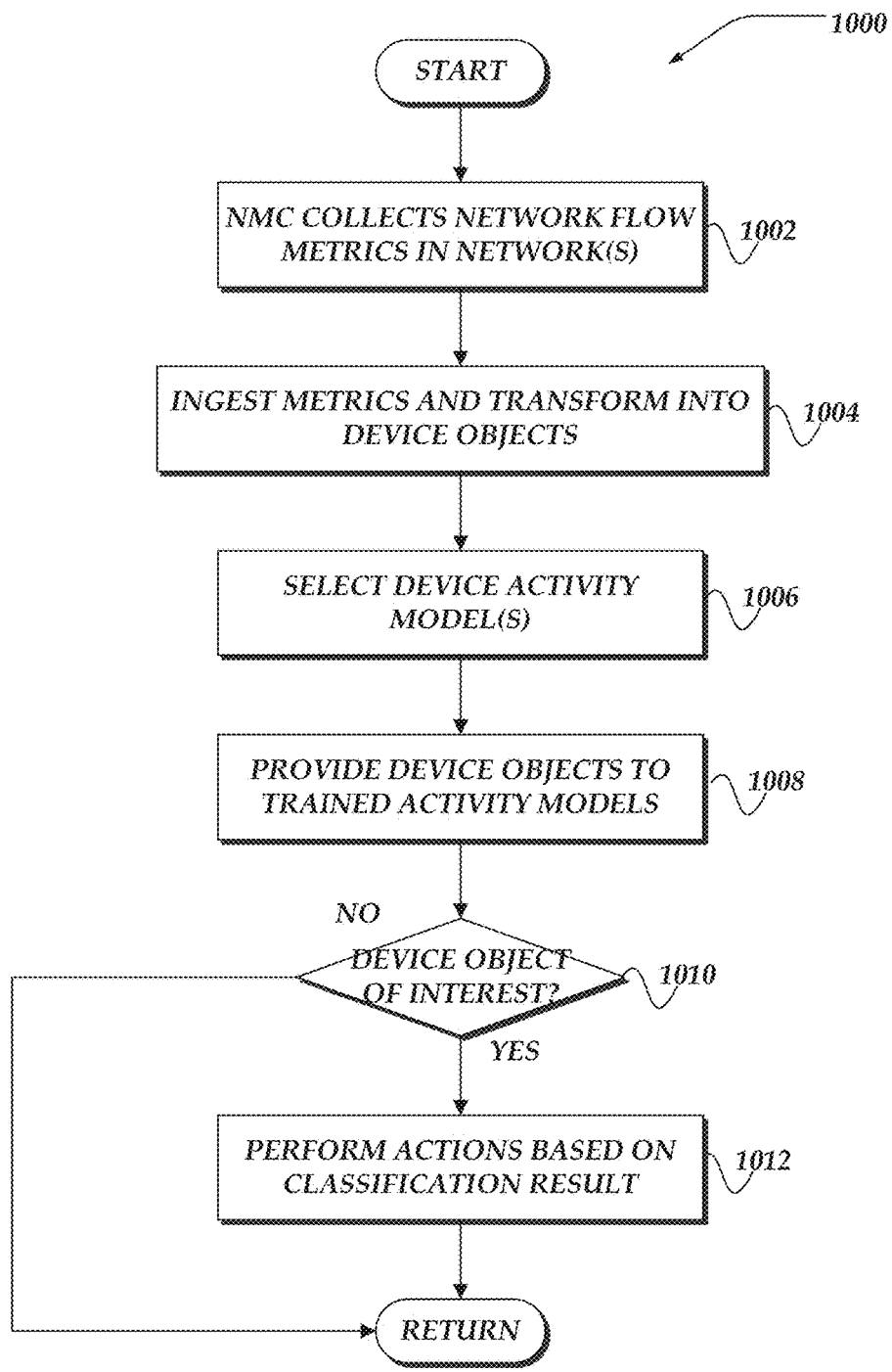
FIG. 10 illustrates a flowchart of a process for classifying applications or activities based on device objects that include one or more profile objects in accordance with one or more of the various embodiments.

FIG. 10 illustrates a flowchart of process 1000 for classifying applications or activities based on device objects that include one or more profile objects in accordance with one or more of the various embodiments. After a start block, at block 1002, in at least one of the various embodiments, the NMC may be arranged to collect network flow metrics in one or more networks. At block 1004, in one or more of the various embodiments, the NMC may be arranged to ingest some or all of the metrics and transform some or all of the metrics into device objects. At block 1006, in one or more of the various embodiments, the NMC may be arranged to select one or more device activity models. In one or more of the various embodiments, a classification engine, such as, classification engine 326 may be arranged to select the one or more device activity models. This is similar to the actions taken in block 806 of FIG. 8 for selecting activity models. At block 1008, in one or more of the various embodiments, the NMC may be arranged to provide some or all of device objects to the selected device activity models. This process may be similar to the actions described for block 808 in FIG. 8. At decision block 1010, in one or more of the various embodiments, if one or more device objects are determine to be of interest, control may flow to block 1012; otherwise, control may be provided to a calling process. At block 1012, in one or more of the various embodiments, one or more actions may be performed based on the classification results.

Again, action performed in this block may be considered similar to the actions described in block 812 of FIG. 8. Next, control may be returned to a calling process.

Figure 11:
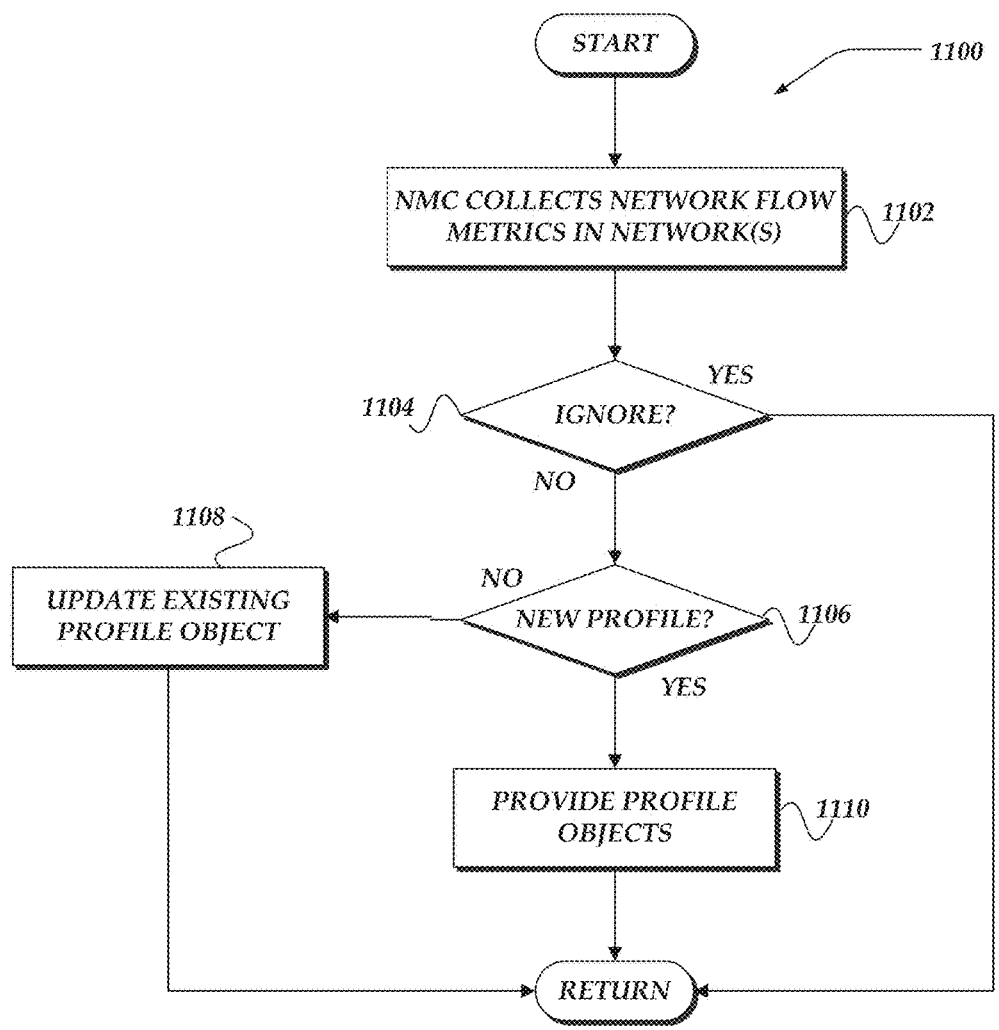
FIG. 11 illustrates a flowchart of a process for progressively providing profile objects (or device objects) in accordance with one or more of the various embodiments.

FIG. 11 illustrates a flowchart of process 1100 for progressively providing profile objects (or device objects) in accordance with one or more of the various embodiments. After a start block, at block 1102, in at least one of the various embodiments, an NMC may be arranged to network flow metrics in one or more monitored networks. As described above, NMCs may be arranged to collect various metrics based on the network traffic that is on the wire or monitored networks.

At decision block 1104, in one or more of the various embodiments, if the traffic or metrics should be ignored such that profile objects are not relevant, control may flow to decision block 1106; otherwise, control may be returned to calling process. In one or more of the various embodiments, the NMC may be arranged to selectively determine if network traffic or its associated metrics should be associated with a profile object. In some embodiments, an NMC may be arranged to apply rules or filters to determine if profile objects for network traffic or associated metrics should be provided. In some embodiments, network traffic from some hosts or services may be excluded from the classification engine, thus maintaining or providing profile objects for such traffic or metrics may be unnecessary.

At decision block 1106, in one or more of the various embodiments, if a new profile object is needed, control may flow to block 1110; otherwise, control may flow to block 1106. In one or more of the various embodiments, the NMC may be arranged to determine if monitored traffic represents a new profile object or if it is associated with an existing profile object.

In one or more of the various embodiments, the NMC may be arranged to execute one or more rules for determining if a new profile object is needed. In some embodiments, these rules or other configuration information may define, patterns, conditions, or the like, the NMC may execute for making this determination. For example, in some embodiments, traffic associated with a previously unseen tuple may be considered to merit a new profile object. In other examples, in some embodiments, traffic associated with a previously seen tuple may be considered to require a new profile object if a defined time period has elapsed since the tuple was last observed.

Also, in some embodiments, the NMC may discover that two or more network flows are related or otherwise are associated with the same application, host, device, or the like. Accordingly, in one or more of the various embodiments, a new profile object may be needed to represent the discovered application(s) in additional the profile objects associated with each of the related network flows.

In one or more of the various embodiments, the NMC may be arranged to selectively provide profile objects depending on configuration information, rules, or the like. Accordingly, in some embodiments, an NMC may be arranged to provide profile objects for certain flows and not for other network flows based on one or more defined conditions. In some embodiments, the NMC may be configured to refrain from creating profile objects in every context. For example, in some embodiments, an NMC may be arranged to create profile objects for applications and not for individual network flows.

At block 1108, in one or more of the various embodiments, the NMC may be arranged to update one or more existing profile objects based on the monitored network traffic or metrics. In one or more of the various embodiments, the NMC may be arranged to map some or all of the metrics to fields or attributes of one or more existing profile objects. As mentioned above, in some embodiments, two or more profile objects may be impacted by the same set of metrics. For example, a single metric such as client network address may be updated for multiple profile objects, such as, network flow profile objects (e.g., client-side flow profile object, server-side flow profile object), one or more application profile objects, device objects, network segment profile objects, or the like.

At block 1110, in one or more of the various embodiments, the NMC may be arranged to provide one or more profile objects based on the collected network traffic or network flow metrics. As discusses, the NMC may be arranged to provide one or more profile objects having various contexts or scope depending on the traffic or metrics. In one or more of the various embodiments, the NMC may be arranged to employ configuration information or one or more rule to determine if the context or scope of profile objects. Also, in one or more of the various embodiments, the NMC may be arranged to map the metrics to one or more fields of the new profile objects.

Note, in one or more of the various embodiments, the actions described for block 1108 and block 1110 may overlap. In some embodiments, the collect network flow metrics may trigger new profile objects to be created as well as some existing profile objects to be updated. For example, in some embodiments, metrics associated with a second network flow may indicate that a first network flow and the second network flow are associated with a single application or service. Accordingly, in this example: a new profile object for the second network flow may be created; a new profile object for the application may be created; and the profile object for the first network flow may be updated. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In at least one embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A network computer for monitoring network traffic in a network, comprising:
   a transceiver that communicates over the network;
   a memory that stores at least instructions; and
   one or more processors that execute instructions to perform actions, comprising:
      employing a network monitoring engine to perform further actions, including:
         monitoring the network to provide one or more metric profiles based on a plurality of characteristics associated with one or more network flows;
         providing one or more profile objects based on the one or more metric profiles; and
         providing the one or more profile objects to a classifier engine; and
      employing the classifier engine to perform further actions, including:
         providing one or more trained activity models selected from a plurality of trained activity models that are based on a ranked ordering of one or more characteristics of the one or more trained activity models and the one or more profile objects; and
         providing one or more classification results for the one or more profile objects based on the one or more trained activity models; and
      employing the network monitoring engine to execute one or more policies based on the one or more classification results associated with the one or more profile object.

2. The network computer of claim 1, further comprising:
   providing one or more labeled profile objects and one or more untrained activity models to a training engine; and
   employing the training engine to perform further actions, including:
      training the one or more untrained activity models based on the one or more labeled profile objects and one or more characteristics of the one or more untrained activity models; and
      providing the one or more newly trained activity models to the classifier engine, wherein the one or more newly trained activity models are employed by the classifier engine to classify the one or more profile objects.

3. The network computer of claim 1, wherein providing the one or more profile objects based on the one or more metric profiles, further comprises:
   selecting two or more metric profiles that are associated with a same activity; and
   providing one or more of the one or more profile objects based on the two or more metric profiles.

4. The network computer of claim 1, wherein providing the one or more profile objects further comprises, discovering one or more metrics that correspond to a network entity in the monitored network based on the characteristics of the one or more network flows, wherein these characteristics are separate from process characteristics associated with the entity.

5. The network computer of claim 1, further comprising:
   providing the one or more classification results to one or more of another computer, a system, a client, or a remote service; and
   employing the one or more of the other computer, the system, the client or the service to perform one or more other actions relevant to the one or more classification results, wherein the other actions include one or more of providing notification messages, providing events, creating log entries, raising user-interface alarms, or raising other alarms.

6. The network computer of claim 1, further comprising, employing the network monitoring engine to provide one or more other profile objects that represent devices on the network, including, one or more of network computers, routers, switches, desktop computers, virtual devices, virtualized components, virtual networks, containers, mobile computers, smart phones, or Internet-of-Things (IoT) devices.

7. The network computer of claim 1, wherein providing the one or more classification results for the one or more profile objects, further comprises, identifying one or more malicious processes or applications based on one or more characteristics of the one or more network flows, wherein these characteristics are collected remotely from process characteristics associated with a host that is executing the one or more malicious processes or applications.

8. The network computer of claim 1, further comprising, employing the network monitoring engine to update one or more existing profile objects based on further monitoring of the one or more network flows or monitoring of one or more new network flows.

9. A system for monitoring network traffic in a network:
   one or more network monitoring computers (NMCs), comprising:
      a transceiver that communicates over the network;
      a memory that stores at least instructions; and
      one or more processors that execute instructions that perform actions, including:
         employing a network monitoring engine to perform further actions, including:
            monitoring the network to provide one or more metric profiles based on a plurality of characteristics associated with one or more network flows;
            providing one or more profile objects based on the one or more metric profiles; and
            providing the one or more profile objects to a classifier engine; and
         employing the classifier engine to perform further actions, including:
            providing one or more trained activity models selected from a plurality of trained activity models that are based on a ranked ordering of one or more characteristics of the one or more trained activity models and the one or more profile objects; and providing one or more classification results for the one or more profile objects based on the one or more trained activity models; and employing the network monitoring engine to execute one or more policies based on the one or more classification results associated with the one or more profile objects; and one or more client computers, comprising:
a transceiver that communicates over the network;
a memory that stores at least instructions; and
one or more processors that execute instructions that perform actions, including:
providing one or more portions of the one or more network flows.

10. The system of claim 9, further comprising:
providing one or more labeled profile objects and one or more untrained activity models to a training engine; and employing the training engine to perform further actions, including:
training the one or more untrained activity models based on the one or more labeled profile objects and one or more characteristics of the one or more untrained activity models; and
providing the one or more newly trained activity models to the classifier engine, wherein the one or more newly trained activity models are employed by the classifier engine to classify the one or more profile objects.

11. The system of claim 9, wherein providing the one or more profile objects based on the one or more metric profiles, further comprises:
selecting two or more metric profiles that are associated with a same activity; and
providing one or more of the one or more profile objects based on the two or more metric profiles.

12. The system of claim 9, wherein providing the one or more profile objects further comprises, discovering one or more metrics that correspond to a network entity in the monitored network based on the characteristics of the one or more network flows, wherein these characteristics are separate from process characteristics associated with the entity.

13. The system of claim 9, further comprising:
providing the one or more classification results to one or more of another computer, a system, a client, or a remote service; and
employing the one or more of the other computer, the system, the client or the service to perform one or more other actions relevant to the one or more classification results, wherein the other actions include one or more of providing notification messages, providing events, creating log entries, raising user-interface alarms, or raising other alarms.

14. The system of claim 9, further comprising, employing the network monitoring engine to provide one or more other profile objects that represent devices on the network, including, one or more of network computers, routers, switches, desktop computers, virtual devices, virtualized components, virtual networks, containers, mobile computers, smart phones, or Internet-of-Things (IoT) devices.

15. The system of claim 9, wherein providing the one or more classification results for the one or more profile objects, further comprises, identifying one or more malicious processes or applications based on one or more characteristics of the one or more network flows, wherein these characteristics are collected remotely from process characteristics associated with a host that is executing the one or more malicious processes or applications.

16. The system of claim 9, further comprising, employing the network monitoring engine to update one or more existing profile objects based on further monitoring of the one or more network flows or monitoring of one or more new network flows.

17. A processor readable non-transitory storage media that includes instructions for monitoring network traffic over a network between one or more computers, wherein execution of the instructions by one or more processors on one or more network monitoring computers (NMCs) performs actions, comprising:
employing a network monitoring engine to perform further actions, including:
monitoring the network to provide one or more metric profiles based on a plurality of characteristics associated with one or more network flows;
providing one or more profile objects based on the one or more metric profiles; and
providing the one or more profile objects to a classifier engine; and
employing the classifier engine to perform further actions, including:
providing one or more trained activity models selected from a plurality of trained activity models that are based on a ranked ordering of one or more characteristics of the one or more trained activity models and the one or more profile objects; and
providing one or more classification results for the one or more profile objects based on the one or more trained activity models; and
employing the network monitoring engine to execute one or more policies based on the one or more classification results associated with the one or more profile objects.

18. The media of claim 17, further comprising:
providing one or more labeled profile objects and one or more untrained activity models to a training engine; and
employing the training engine to perform further actions, including:
training the one or more untrained activity models based on the one or more labeled profile objects and one or more characteristics of the one or more untrained activity models; and
providing the one or more newly trained activity models to the classifier engine, wherein the one or more newly trained activity models are employed by the classifier engine to classify the one or more profile objects.

19. The media of claim 17, wherein providing the one or more profile objects based on the one or more metric profiles, further comprises:
selecting two or more metric profiles that are associated with a same activity; and
providing one or more of the one or more profile objects based on the two or more metric profiles.

20. The media of claim 17, wherein providing the one or more profile objects further comprises, discovering one or more metrics that correspond to a network entity in the monitored network based on the characteristics of the one or more network flows, wherein these characteristics are separate from process characteristics associated with the entity.

21. The media of claim 17, further comprising:
providing the one or more classification results to one or more of another computer, a system, a client, or a remote service; and
employing the one or more of the other computer, the system, the client or the service to perform one or more other actions relevant to the one or more classification results, wherein the other actions include one or more of providing notification messages, providing events, creating log entries, raising user-interface alarms, or raising other alarms.

22. The media of claim 17, further comprising, employing the network monitoring engine to provide one or more other profile objects that represent devices on the network, including, one or more of network computers, routers, switches, desktop computers, virtual devices, virtualized components, virtual networks, containers, mobile computers, smart phones, or Internet-of-Things (IoT) devices.

23. The media of claim 17, wherein providing the one or more classification results for the one or more profile objects, further comprises, identifying one or more malicious processes or applications based on one or more characteristics of the one or more network flows, wherein these characteristics are collected remotely from process characteristics associated with a host that is executing the one or more malicious processes or applications.

24. A network computer for monitoring communication over a network between one or more computers, comprising:
a transceiver that communicates over the network;
a memory that stores at least instructions; and
one or more processors that execute instructions that perform actions, including:
employing a network monitoring engine to perform further actions, including:
monitoring the network to provide one or more metric profiles based on a plurality of characteristics associated with one or more network flows;
providing one or more profile objects based on the one or more metric profiles; and
providing the one or more profile objects to a classifier engine; and
employing the classifier engine to perform further actions, including:
providing one or more trained activity models selected from a plurality of trained activity models that are based on a ranked ordering of one or more characteristics of the one or more trained activity models and the one or more profile objects; and
providing one or more classification results for the one or more profile objects based on the one or more trained activity models; and
employing the network monitoring engine to execute one or more policies based on the one or more classification results associated with the one or more profile objects.

25. The network computer of claim 24, further comprising:
providing one or more labeled profile objects and one or more untrained activity models to a training engine; and
employing the training engine to perform further actions, including:
training the one or more untrained activity models based on the one or more labeled profile objects and one or more characteristics of the one or more untrained activity models; and
providing the one or more newly trained activity models to the classifier engine, wherein the one or more newly trained activity models are employed by the classifier engine to classify the one or more profile objects.

26. The network computer of claim 24, wherein providing the one or more profile objects based on the one or more metric profiles, further comprises:
selecting two or more metric profiles that are associated with a same activity; and
providing one or more of the one or more profile objects based on the two or more metric profiles.

27. The network computer of claim 24, wherein providing the one or more profile objects further comprises, discovering one or more metrics that correspond to a network entity in the monitored network based on the characteristics of the one or more network flows, wherein these characteristics are separate from process characteristics associated with the entity.

28. The network computer of claim 24, further comprising:
providing the one or more classification results to one or more of another computer, a system, a client, or a remote service; and
employing the one or more of the other computer, the system, the client or the service to perform one or more other actions relevant to the one or more classification results, wherein the other actions include one or more of providing notification messages, providing events, creating log entries, raising user-interface alarms, or raising other alarms.

29. The network computer of claim 24, further comprising, employing the network monitoring engine to provide one or more other profile objects that represent devices on the network, including, one or more of network computers, routers, switches, desktop computers, virtual devices, virtualized components, virtual networks, containers, mobile computers, smart phones, or Internet-of-Things (IoT) devices.

30. The network computer of claim 24, wherein providing the one or more classification results for the one or more profile objects, further comprises, identifying one or more malicious processes or applications based on one or more characteristics of the one or more network flows, wherein these characteristics are collected remotely from process characteristics associated with a host that is executing the one or more malicious processes or applications.

\* \* \* \* \*